Patented June 12, 1951

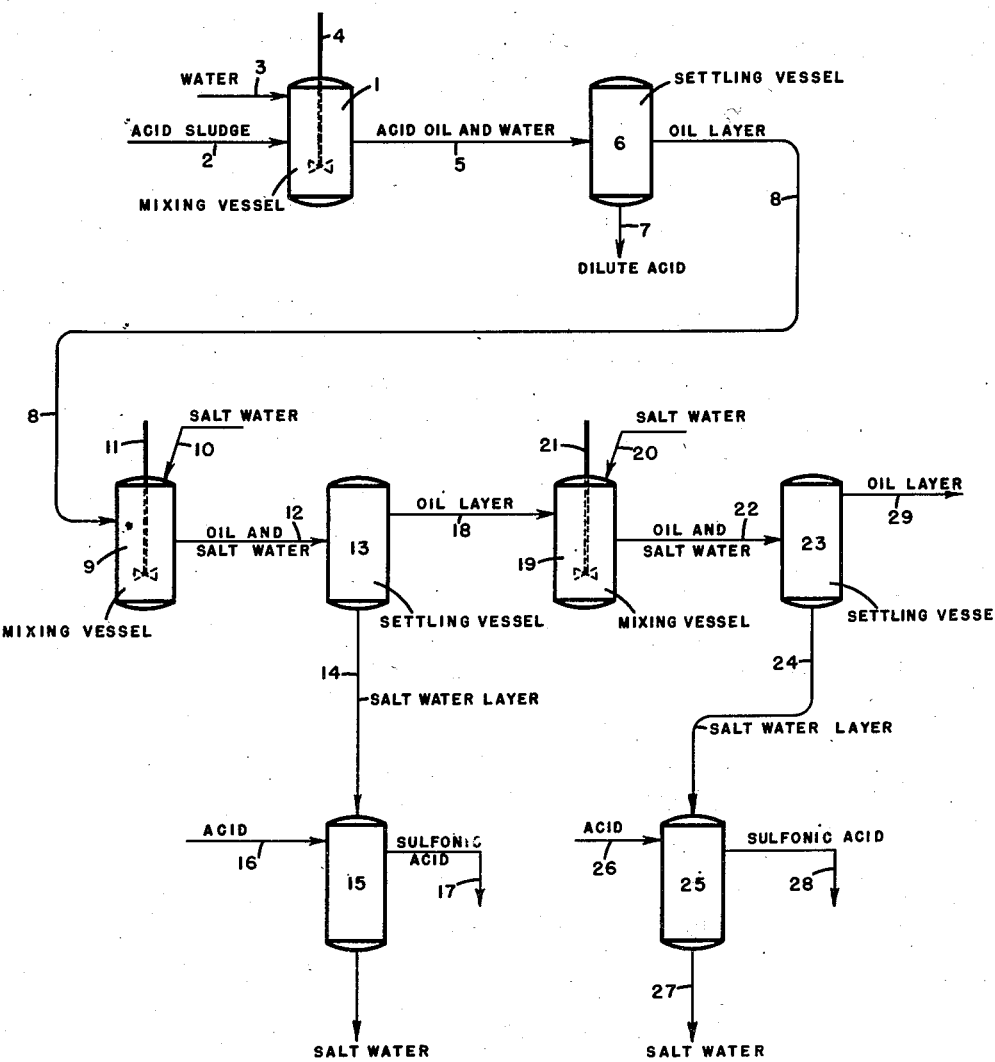

2,556,256

UNITED STATES PATENT OFFICE 2,556,256

FRACTIONAL SEPARATION OF SULFONIC ACIDS

John H. Cone and Roy V. Comeaux, Baytown, Tex., assignors, by mesne assignments, to Standard Oil Development Company, Elizabeth, N. J., a corporation of Delaware Application June 7, 1948, Serial No. 31,448

3 Claims. (Cl. 260—504)

This invention relates to a process of preparing petroleum sulfonic acids in substantially pure form and more particularly to a process of extracting sulfonic acids in relatively pure form from acid sludges resulting from the treatment of petroleum oils with sulfonating agents.

In the refining of petroleum fractions, sulfonating agents, such as sulfuric acid, chlorosulfonic acid, fluorosulfonic acid and fuming sulfuric acid, are used for treating various petroleum fractions. In the treatment of such fractions, the sulfonating agent converts certain of the hydrocarbons present therein to sulfonic acids. Ordinarily, the petroleum fraction is contacted with the sulfonating agent and the sludge formed during contacting is separated from the main body of the oil. The character of the sludge is, of course, dependent upon the character of the original petroleum fraction and further upon the sulfonating agent employed and upon the conditions of the treatment. In general, however, irrespective of the source of the petroleum fraction and of the conditions of treatment, the sludge formed contains substantial quantities of sulfonic acids. Heretofore, the sulfonic acids present in the sludge have been separated therefrom by various means such as, for example, by the selective action of solvents or by diluting the acid sludge with water and subsequently salting out the sulfonic acids. It is also known to recover the sulfonic acids from acid sludges by diluting the acid sludge with water and adding a hydroxide which will form an insoluble precipitate with the sulfonic acid. The foregoing methods are not entirely satisfactory, particularly inasmuch as the sulfonic acids finally recovered contain substantial quantities of oil and other impurities.

The object of this invention is to separate sulfonic acids from acid sludges in substantially pure form.

According to our invention, sulfonic acids are recovered from acid sludges by contacting the washed acid sludge with successive batches of saline solutions. More specifically the acid sludge is admixed with a sufficient quantity of water substantially to remove the sulfonating agent present, the admixture is allowed to separate into an aqueous layer and an oily layer, and the oily layer known as "acid oil" is subsequently treated with successive batches of saline solution. The aforementioned acid oil contains the sulfonic acids which it is desired to recover. The concentration of salt in the successive batches of saline solution is so regulated that the first solution contains the highest concentration of salt, while the last solution contains the lowest concentration of salt. The sulfonic acids present in the acid oil are successively removed by the saline solutions and are recovered from these solutions by suitable means such as, for example, acidification of the solution. The saline solutions employed, even the most concentrated, ordinarily contain not more than 5000 parts per million of salt while the most dilute ordinarily should contain not less than 100 parts per million of salt. Any salt which will dissolve in water to the extent indicated above and which will not form an insoluble precipitate when contacted with sulfonic acids may be employed. Examples of such salts are: sodium chloride, potassium chloride, sodium sulfate, sodium nitrate, etc. It will ordinarily be found desirable to employ sea water or other brine solutions, the concentration of the salt in the solution being controlled by the addition of fresh water, that is, water having a relatively low salt content.

Having briefly described our invention, reference will now be made to the drawing in which the single figure represents a flow diagram illustrating a preferred mode. Referring now to the drawing, numeral 1 represents a mixing chamber into which acid sludge is introduced by means of line 2 and water is introduced by means of line 3. The water and acid sludge are intimately mixed in chamber 1 by means of a suitable agitator 4 and the admixture is withdrawn from chamber 1 by means of line 5 and introduced into settling vessel 6. A dilute acid layer is withdrawn through line 7 while the water washed oily layer, which contains the sulfonic acids which are to be recovered, is withdrawn through line 8. The water-washed acid oil layer withdrawn through line 8 is introduced into mixing chamber 9 where it is contacted with a saline solution introduced through line 10, the acid oil and the saline solution being agitated by means of a suitable agitator 11. The agitated mixture is withdrawn through line 12 and introduced into settling chamber 13 where the admixture is permitted to separate into an oily layer and an aqueous layer. The aqueous layer is withdrawn through line 14 and introduced into chamber 15. This aqueous layer contains sulfonic acids dissolved therein in relatively pure form. These sulfonic acids may be recovered from the saline solution by any suitable means and in the present embodiment the sulfonic acids are separated from the aqueous layer by introducing through line 16 an agent, such as acid, which will cause separation of the sulfonic acid in the form of a liquid. Sulfonic acids are withdrawn in relatively pure form from chamber 15 through line 17.

The oily layer separated in settling chamber 13 is withdrawn therefrom through line 18 and introduced into mixing chamber 19 where it is admixed with water introduced through line 20 and agitated by means of a suitable agitator 21. The agitated mixture is withdrawn from mixing chamber 19 through line 22 and introduced into settling chamber 23 where the admixture separates into two phases, an oily phase and an aqueous phase. The aqueous phase is withdrawn from settling chamber 23 through line 24 and introduced into chamber 25. This aqueous layer contains sulfonic acids dissolved therein in relatively pure form. The sulfonic acids are recovered from the saline solution in chamber 25 by any suitable means such, for example, as introducing acid into said chamber through line 26. The sulfonic acids caused to separate by the addition of acid are withdrawn from chamber 25 through line 28 while the acidified saline solution may be withdrawn through line 27. The oily layer permitted to separate in chamber 23 is withdrawn therefrom through line 29 and may, if desired, be treated with additional amounts of saline solution in additional contacting and separating stages, not shown.

Although as many as four or five contacting and separating stages may profitably be employed, it will ordinarily be necessary to employ only two or three stages to secure sulfonic acids in relatively pure form. It will further be appreciated that the purity of the sulfonic acids will depend upon the concentration of salts in the saline solutions employed. When very high concentrations of salt are maintained, the amount of sulfonic acid which will dissolve in the solution is relatively low, while the purity of the acids is very high. When acids of very high purity are desired, concentrations of about 5000 parts per million of salt should be employed in the first stage. In succeeding stages the concentration of salt in saline solution should be reduced in a step-wise manner. While it will be obvious that the concentrations which should be maintained in each stage will be dependent upon the purity desired, ordinarily the concentration of salt in the first stage should be approximately 5000 parts per million, while the concentration of salt in the saline solution used in the last stage should be in the range of 100 parts per million. The concentration of salt in the intervening stages should be intermediate of the concentration in the first and last stages.

The desirability of washing acid oil with saline solution rather than with pure water is shown by the following run:

750 volumes of acid oil was divided into three portions of 250 volumes each. The first portion was admixed with 150 volumes of tap water containing 100 parts per million of chlorides, while the second was admixed with 150 volumes of water containing 1750 parts per million of chlorides and the third was admixed with 150 volumes of water containing 3550 parts per million of chlorides. After thorough mixing, each sample was permitted to separate into an aqueous phase and an oil phase. The aqueous phase was separated and the sulfonic acids recovered therefrom. In this instance the sulfonic acids were separated from the water phase by addition of approximately 10% of sulfuric acid based on water. The table below indicates the amount of sulfonic acids recovered in each instance. This table further indicates the condition of the recovered sulfonic acids:

Table

|  | Fresh Water Wash | Salt Water Washes | |
|---|---|---|---|
|  | (1) | (2) | (3) |
| Volume Acid Oil, cc | 250 | 250 | 250 |
| Wash Water Volume, cc | 150 | 150 | 150 |
| Chlorides, p. p. m | 100 | 1,750 | 3,550 |
| Separated Wash Water, cc | 148 | 150 | 150 |
| Water Soluble Oils, cc | 15 | 8 | 4.5 |
| Appearance of Water Soluble Oils after Separation and drying. | Sludge type material, high in sediment and hexane soluble oil. | Intermediate to 1 and 3 | Bright fluid mixture almost completely oil free. |

It will be noted that the sample of acid oil treated with the salt solution containing 3550 parts per million of chlorides yielded a substantial quantity of sulfonic acids of good color and completely free of oil. On the other hand, the sulfonic acids recovered from the sample treated with water containing 100 parts per million of chlorides contained a substantial amount of oil and were very dark in appearance.

It will be appreciated, of course, that the sulfonic acids present in sludges will vary as to their molecular weights, the ones having the highest molecular weights being found in the high boiling petroleum fractions while the lower molecular weight sulfonic acids are found in the lower boiling fractions. Our process is adapted for recovery of sulfonic acids from petroleum fractions irrespective of their molecular weights. Inasmuch, however, as petroleum fractions boiling in the gas-oil and lubricating oil range are most often acid treated, our invention is particularly applicable to the recovery of sulfonic acids resulting from the acid treatment of such fractions.

We claim:

1. The process for separating green sulfonic acids in substantially pure form from a sludge resulting from the treatment of a petroleum fraction in the gas oil and lubricating oil boiling range with a sulfonating agent which comprises admixing with water an acid sludge resulting from the treatment of said fraction with the sulfonating agent, separating an oily layer from said admixture, contacting the oily layer with successive batches of a saline solution containing successively lower concentrations of salt, each of said batches having not less than 100 parts per million of salt dissolved therein and recovering sulfonic acid from each of said successive batches.

2. A process for separating green sulfonic acids in substantially pure form from an acid sludge derived from the treatment of a petroleum fraction in the gas oil and lubricating oil boiling range with a sulfonating agent which comprises admixing said acid sludge with water, separating an oil layer from said admixture, contacting said oily layer with successive batches of saline solution containing successively lower concentrations of salt in the range of 5000 parts per million and 100 parts per million thereof and recovering sulfonic acids from said saline solutions.

3. A process for separating substantially pure green sulfonic acids from acid sludge derived from the treatment of a petroleum fraction in the gas oil and lubricating oil boiling range with a sulfonating agent which comprises admixing said acid sludge with water, separating an oily layer from said admixture, contacting said oily layer with a saline solution containing not more than 5000 parts per million and not less than 100 parts per million of dissolved salts in the first of a plurality of stages, separating a second oily layer from said first stage, contacting said second oily layer with a saline solution having a lower salt content than the saline solution used in said first stage but containing not more than 5000 parts per million of salt and not less than 100 parts per million of salt in the second of a plurality of stages, and subsequently recovering sulfonic acids from said saline solutions.

JOHN H. CONE.
ROY V. COMEAUX.

REFERENCES CITED

The following references are of record in the file of this patent:

UNITED STATES PATENTS

| Number | Name | Date |
| --- | --- | --- |
| 2,035,106 | Vesterdal et al. | Mar. 24, 1936 |
| 2,397,077 | Alspaugh | Mar. 26, 1946 |
| 2,397,191 | Meyer | Mar. 26, 1946 |

OTHER REFERENCES

The Chemistry of Petroleum Derivatives, by Ellis, pp. 1014–1015.